(12) United States Patent
Kuno (10) Patent No.: US 8,018,633 B2
(45) Date of Patent: *Sep. 13, 2011

(54) CONVERSION TABLE CREATING DEVICE, STORAGE MEDIUM STORING CONVERSION TABLE CREATING PROGRAM, AND CONVERSION TABLE CONVERTING METHOD

(75) Inventor: Masashi Kuno, Obu (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 281 days.

This patent is subject to a terminal disclaimer.

(21) Appl. No.: 12/358,577

(22) Filed: Jan. 23, 2009

(65) Prior Publication Data

US 2009/0185245 A1    Jul. 23, 2009

(30) Foreign Application Priority Data

Jan. 23, 2008   (JP) .................................. 2008-012905

(51) Int. Cl.
*G03F 3/08* (2006.01)
(52) U.S. Cl. ........................... 358/523; 358/1.9; 358/524
(58) Field of Classification Search .................... 358/1.9, 358/504, 518, 523, 524, 525; 382/162, 167; 345/589, 668

See application file for complete search history.

(56) References Cited

U.S. PATENT DOCUMENTS

| | | | |
|---|---|---|---|
| 5,692,071 A | 11/1997 | Govaert | |
| 5,930,388 A | 7/1999 | Murakami et al. | |
| 6,055,074 A * | 4/2000 | Himoto | 358/518 |
| 6,222,639 B1 * | 4/2001 | Suzuki | 358/1.9 |
| 7,557,954 B2 * | 7/2009 | Heydinger et al. | 358/1.9 |
| 2007/0070366 A1 * | 3/2007 | Heydinger et al. | 358/1.9 |
| 2009/0184974 A1 * | 7/2009 | Kuno | 345/589 |
| 2010/0284030 A1 * | 11/2010 | Yoshida et al. | 358/1.9 |

FOREIGN PATENT DOCUMENTS

| | | |
|---|---|---|
| JP | H8-500945 | 1/1996 |
| JP | 10-136216 | 5/1998 |
| JP | 10-276337 | 10/1998 |
| JP | 2000-253270 | 9/2000 |
| JP | 2002-64719 | 2/2002 |
| JP | 2002-281328 | 9/2002 |
| JP | 2003-125224 | 4/2003 |
| JP | 2004-364144 | 12/2004 |

* cited by examiner

*Primary Examiner* — Kimberly A Williams
(74) *Attorney, Agent, or Firm* — Scully, Scott, Murphy & Presser, P.C.

(57) ABSTRACT

An update performing unit repeatedly performs an updating process by controlling a second reference point setting unit to set a plurality of second reference points that are uniformly distributed in a subspace in the second color space; a calculation unit to calculate color differences between a set of fifth color data for each second reference point in the subspace and a single first reference point; a first judging unit to judge whether or not the smallest color difference among all the color differences with respect to each of the second reference points in the subspace is smaller than a color difference registered at the single first reference point; and a updating unit to update, if the first judging unit judges that the smallest color difference is smaller than the color difference, a set of fourth color data, that is already registered at the single first reference point, to a set of fourth color data for the each second reference point in the subspace.

7 Claims, 6 Drawing Sheets

CONVERSION TABLE CREATING DEVICE, STORAGE MEDIUM STORING CONVERSION TABLE CREATING PROGRAM, AND CONVERSION TABLE CONVERTING METHOD

CROSS REFERENCE TO RELATED APPLICATION

The present application claims priority from Japanese patent application No. 2008-012905 filed Jan. 23, 2008. The entire contents of the priority applications are incorporated herein by reference.

TECHNICAL FIELD

The present invention relates to a conversion table creating device, a storage medium storing a conversion table creating program, and a conversion table creating method for creating a color conversion table.

BACKGROUND

Methods of creating a color conversion table are known. The color conversion table is used to achieve color matching in a device such as a color printer, by converting one color data about an uniform color space that does not depends on the device characteristics, to another color data about another color space that depends on the device characteristics.

Japanese Patent Application Publication No. 2002-64719, for example, discloses a method of obtaining a set of RGB values (point Q) to be input to a printer. The method defines one space to be output from the printer as an output color space (Lab color space that is the uniform color space) and another space to be input to the printer as an input color space (RGB color space). Further, the method is used to obtain the RGB value set (point Q) for providing a set of Lab values (point P).

Specifically, the printer prints a color patch. The color patch includes 729 colors (=9×9×9) that are uniformly distributed in the RGB color space that is an input color space of the printer. The color of the color patch is measured. A measured Lab value set (nearest point R) in the 729 colors, that is closest to the point P, is searched in the Lab color space. Next, cubic spaces are specified, each of the cubic spaces including one vertex of which is the nearest point R. Then, Lab value sets corresponding to all RGB value sets existing in the specified cubic spaces are obtained by interpolation. The nearest point R (a set of Lab values) of the point P is searched from the Lab value sets obtained by the interpolation. The RGB value set for the nearest point R (which is regarded as point Q) is stored in a color conversion table.

SUMMARY

The accuracy of converting colors in the color conversion table can be enhanced by setting a plurality of interpolation points through the interpolation as in the method disclosed in Japanese Patent Application Publication No. 2002-64719. The larger the number of interpolation points thus set, the higher the accuracy will be. However, the required calculation time will increase as the interpolation point increases in number. In view of this, how efficiently the interpolation points should be set is very important.

In the method disclosed in Japanese Patent Application Publication No. 2002-64719, the Lab value sets that corresponds to all RGB values in the cubic space whose vertex is the nearest point R specified in the RGB color space are obtained by the interpolation. Thus, the method can convert colors at high accuracy. However, the method cannot create the color conversion table efficiently since the interpolation is performed excessively.

In view of the foregoing, it is an object of the present invention to provide a conversion table creating device, a storage medium storing a conversion table creating program, and a conversion table creating method, which is capable of setting the interpolation points required for creating the color conversion table efficiently.

To achieve the above and other objects, one aspect of the invention provides a conversion table creating device for creating a color conversion table for converting a set of first color data defined in a first color space, that is a uniform color space, to a set of second color data defined in a second color space different from the first color space. The conversion table creating device includes a first reference point setting unit, a second reference point setting unit, a color data setting unit, an identifying unit, a calculation unit, a determining unit, a registering unit, a first judging unit, an updating unit, and an update performing unit. A first reference point setting unit sets a plurality of first reference points that are uniformly distributed in the first color space. Each of the plurality of first reference points is defined by a set of third color data that is defined in the first color space. The second reference point setting unit sets a plurality of second reference points that are uniformly distributed in the second color space. Each of the plurality of second reference points is defined by a set of fourth color data that is defined in the second color space. The color data setting unit sets a plurality of sets of fifth color data that are defined in the first color space in one to one correspondence with the plurality of fourth color data sets. The identifying unit identifies a single first reference point, that is closest to the fifth color data set for each of the second reference points. The calculation unit calculates, for each of all the second reference points, a color difference between the fifth color data set for the each second reference point and the single first reference point that is identified by the identifying unit for the each second reference point. The determining unit determines, for each of the single first reference points, a single fifth color data set that has the smallest color difference from the single first reference point among all the color differences that are calculated with respect to the single first reference point by the calculating unit. The registering unit registers, at each of the single first reference points, the fourth color data set that is set in correspondence with the single fifth color data sets that is determined by the determining unit. The update performing unit repeatedly performs an updating process for each of the single first reference points. The update performing unit performs the updating process by controlling (1) the second reference point setting unit to further set a plurality of second reference points that are uniformly distributed in a subspace in the second color space, the subspace encompassing only a single one among the plurality of second reference points already set by the second reference point setting unit, the fourth color data set of the single second reference point being registered at the single first reference point, each of the plurality of second reference points in the subspace being defined by a set of fourth color data that is defined in the second color space; (2) the color data setting unit to set a plurality of sets of fifth color data that are defined in the first color space in one to one correspondence with the plurality of fourth color data sets of the second reference points in the subspace; (3) the calculation unit to calculate, for each of all the second reference points in the subspace, color differences between the fifth color data set for each second reference point in the subspace and the single first reference point, at which the fourth color data set of the single second reference point is registered; (4) the first judging unit to judge whether or not the smallest color difference among all the color differences that are calculated with respect to each of the second reference points in the subspace is smaller than the color difference between the fifth color data set in correspondence with the fourth color data set of the single second reference point and the single first reference point, at which the fourth color data set of the single second reference point is registered; and (5) the updating unit to update, if the first judging unit judges that the smallest color difference among all the color differences is smaller than the color difference between the fifth color data set in correspondence with the fourth color data set of the single second reference point and the single first reference point, at which the fourth color data set of the single second reference point is registered, the fourth color data set, that is already registered at the single first reference point, to the fourth color data set that is set in correspondence with the fifth color data set having the smallest color difference among all the color differences that are calculated with respect to the each second reference point in the subspace.

In another aspect of the present invention, there is provided a computer-readable storage medium storing a computer-executable conversion table creating program for a conversion table creating device. The conversion table creating device creates a color conversion table for converting a set of first color data defined in a first color space, that is a uniform color space, to a set of second color data defined in a second color space different from the first color space. The conversion table creating program includes:

instructions for setting a plurality of first reference points that are uniformly distributed in the first color space, each of the plurality of first reference points being defined by a set of third color data that is defined in the first color space;

instructions for setting a plurality of second reference points that are uniformly distributed in the second color space, each of the plurality of second reference points being defined by a set of fourth color data that is defined in the second color space;

instructions for setting a plurality of sets of fifth color data that are defined in the first color space in one to one correspondence with the plurality of fourth color data sets;

instructions for identifying a single first reference point, that is closest to the fifth color data set for each of the second reference points;

instructions for calculating, for each of all the second reference points, a color difference between the fifth color data set for the each second reference point and the single first reference point that is identified in the identifying instructions for the each second reference point;

instructions for determining, for each of the single first reference points, a single fifth color data set that has the smallest color difference from the single first reference point among all the color differences that are calculated with respect to the single first reference point in the calculating instructions;

instructions for registering, at each of the single first reference points, the fourth color data set that is set in correspondence with the single fifth color data sets that is determined in the determining instructions; and instructions for repeatedly performing an updating process for each of the single first reference points. The updating process is performed (1) to further set a plurality of second reference points that are uniformly distributed in a subspace in the second color space, the subspace encompassing only a single one among the plurality of second reference points already set in response to the instructions for setting the plurality of second reference points, the fourth color data set of the single second reference point being registered at the single first reference point, each of the plurality of second reference points in the subspace being defined by a set of fourth color data that is defined in the second color space; (2) to set a plurality of sets of fifth color data that are defined in the first color space in one to one correspondence with the plurality of fourth color data sets of the second reference points in the subspace; (3) to calculate, for each of all the second reference points in the subspace, color differences between the fifth color data set for each second reference point in the subspace and the single first reference point, at which the fourth color data set of the single second reference point is registered; (4) to judge whether or not the smallest color difference among all the color differences that are calculated with respect to each of the second reference points in the subspace is smaller than the color difference between the fifth color data set in correspondence with the fourth color data set of the single second reference point and the single first reference point, at which the fourth color data set of the single second reference point is registered; and (5) to update, if the smallest color difference among all the color differences is smaller than the color difference between the fifth color data set in correspondence with the fourth color data set of the single second reference point and the single first reference point, at which the fourth color data set of the single second reference point is registered, the fourth color data set, that is already registered at the single first reference point, to the fourth color data set that is set in correspondence with the fifth color data set having the smallest color difference among all the color differences that are calculated with respect to the each second reference point in the subspace.

In another aspect of the present invention, there is provided a conversion table creating method for a conversion table creating device. The conversion table creating device creates a color conversion table for converting a set of first color data defined in a first color space, that is a uniform color space, to a set of second color data defined in a second color space different from the first color space. The conversion table creating method includes:

setting a plurality of first reference points that are uniformly distributed in the first color space, each of the plurality of first reference points being defined by a set of third color data that is defined in the first color space;

setting a plurality of second reference points that are uniformly distributed in the second color space, each of the plurality of second reference points being defined by a set of fourth color data that is defined in the second color space;

setting a plurality of sets of fifth color data that are defined in the first color space in one to one correspondence with the plurality of fourth color data sets;

identifying a single first reference point, that is closest to the fifth color data set for each of the second reference points;

calculating, for each of all the second reference points, a color difference between the fifth color data set for the each second reference point and the single first reference point that is identified in the identifying instructions for the each second reference point;

determining, for each of the single first reference points, a single fifth color data set that has the smallest color difference from the single first reference point among all the color differences that are calculated with respect to the single first reference point in the calculating instructions;

registering, at each of the single first reference points, the fourth color data set that is set in correspondence with the single fifth color data sets that is determined in the determining instructions; and performing an updating process for each of the single first reference points repeatedly. The updating process is performed (1) to further set a plurality of second reference points that are uniformly distributed in a subspace in the second color space, the subspace encompassing only a single one among the plurality of second reference points already set in response to the instructions for setting the plurality of second reference points, the fourth color data set of the single second reference point being registered at the single first reference point, each of the plurality of second reference points in the subspace being defined by a set of fourth color data that is defined in the second color space; (2) to set a plurality of sets of fifth color data that are defined in the first color space in one to one correspondence with the plurality of fourth color data sets of the second reference points in the subspace; (3) to calculate, for each of all the second reference points in the subspace, color differences between the fifth color data set for each second reference point in the subspace and the single first reference point, at which the fourth color data set of the single second reference point is registered; (4) to judge whether or not the smallest color difference among all the color differences that are calculated with respect to each of the second reference points in the subspace is smaller than the color difference between the fifth color data set in correspondence with the fourth color data set of the single second reference point and the single first reference point, at which the fourth color data set of the single second reference point is registered; and (5) to update, if the smallest color difference among all the color differences is smaller than the color difference between the fifth color data set in correspondence with the fourth color data set of the single second reference point and the single first reference point, at which the fourth color data set of the single second reference point is registered, the fourth color data set, that is already registered at the single first reference point, to the fourth color data set that is set in correspondence with the fifth color data set having the smallest color difference among all the color differences that are calculated with respect to the each second reference point in the subspace.

DETAILED DESCRIPTION

Next, a conversion table creating device according to an embodiment of the present invention will be described with reference to the accompanying drawings.

1. Overall Configuration

Figure 1:
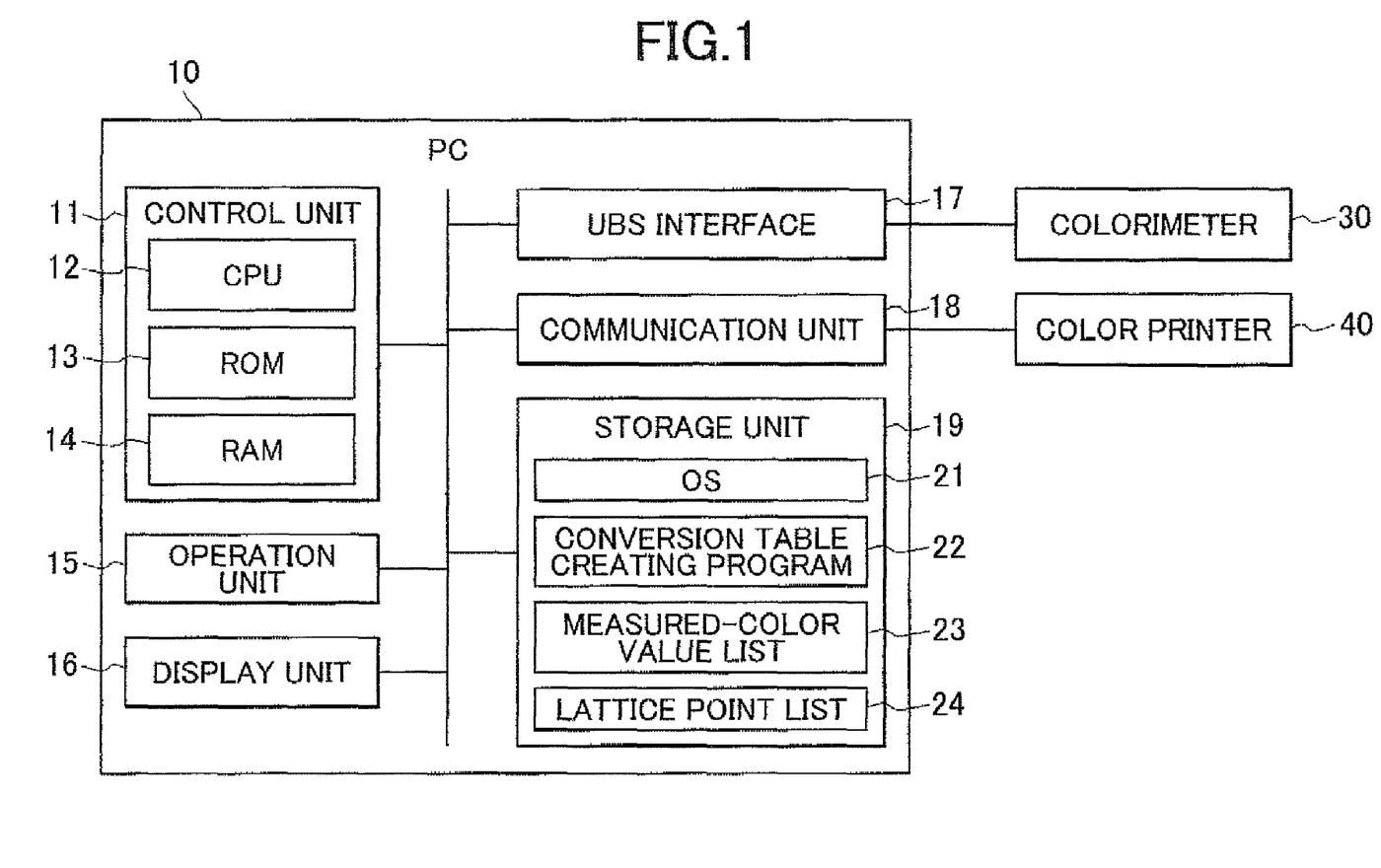
FIG. 1 is a block diagram showing the general structure of a personal computer according to an embodiment of the present invention.

FIG. 1 is a block diagram showing a schematic configuration of a personal computer 10 as a conversion table creating device according to the embodiment of the present invention.

As shown in FIG. 1, the personal computer 10 includes a control unit 11, an operation unit 15, a display unit 16, a UBS interface 17, a communication unit 18, and a storage unit 19. The control unit 11 is composed of a microcomputer that includes a CPU 12, a ROM 13, and a RAM 14. The control unit 11 controls another components of the personal computer 10.

The operation unit 15 allows the user to input commands for controlling the personal computer 10. The operation unit 15 includes, for example, a keyboard and a pointing device (e.g., mouse). The display unit 16 displays various data in the form of images the user can visually recognize. The display unit 16 is, for example, a liquid crystal display.

The UBS interface 17 transmits and receives data through a USB cable. Through the USB cable, the personal computer 10 according to this embodiment can communicate with a colorimeter 30. The colorimeter 30 measures a color of a color patch, represents the measured color as color data based on a uniform color space (i.e., CIELAB color space, in this embodiment), irrespective of the device characteristics, and transmits the color data to the personal computer 10. The uniform color space is created such that perceived color difference substantially matches the Euclidian distance between colors in the color space. Examples of uniform color spaces known in the art are the CIELAB color space and the CIELUV color space.

The communication unit 18 transmits and receives data via a network. The personal computer 10 according to this embodiment can communicate with a color printer 40 via the network (a local area network (LAN), in this embodiment). The color printer 40 receives color-image data based on RGB values from the personal computer 10. The color printer 40 is capable of printing an image according to the color-image data on a recording medium such as a paper sheet.

The storage unit 19 stores various data. The storage unit 19 is, for example, a hard disk drive. An operating system (OS) 21 and a conversion table creating program 22 are installed in the storage unit 19. The conversion table creating program 22 controls the control unit 11 to execute the table creating process for creating a color conversion table for the color printer 40. The storage unit 19 stores a measured-color value list 23 and a lattice point list 24, which will be described later.

2. Procedure for Creating Color Conversion Table

Next, a procedure performed by the personal computer 10 to create a color conversion table will be described.

Through the procedure described below, the personal computer 10 creates a color conversion table that is used to convert one color value based on the CIELAB color space irrespective of the device characteristics, to another color value based on the RGB color space that depends on the device (the color printer 40 in this embodiment) characteristics.

First, the personal computer 10 uses the color printer 40 to print a color patch. In this embodiment, the personal computer 10 controls the color printer 40 to print a color patch having 9×9×9=729 colors in which each of the RGB value sets is varied in nine steps. That is, the 729 colors are obtained by combining nine R values, nine G values, and nine B values. In other words, the personal computer 10 controls the color printer 40 to print a color patch with $9^3$ lattice points regularly (or uniformly) distributed in the RGB color space (hereinafter referred to as "RGB lattice points"). Since RGB values are expressed in 16 bits in the following description, the nine steps of RGB values are expressed as 0, 8192, 16384, 24576, 32768, 40960, 49152, 57344, and 65535.

Next, the personal computer 10 controls the colorimeter 30 to measure each color in the color patch printed by the color printer 40 in order to obtain color values (a plurality of sets of Lab values in the CIELAB color space) for each of the 729 colors.

Next, the personal computer 10 performs interpolation based on the measured Lab value sets for the 729 colors. Specifically, while the vertices (RGB lattice points) of each RGB cubic space obtained by dividing each axis of the RGB color space into eight sections correspond to RGB values in the color patch, the personal computer 10 further divides each RGB cubic space by sixteen along each axis and sets the vertices of the newly obtained RGB cubic spaces to interpolation points. Thus, these vertices are added as new RGB lattice points. Next, the personal computer 10 calculates a set of Lab values in the CIELAB color space (i.e. measured color value set) for each RGB interpolation point through interpolation (such as a three-dimensional, volumetric linear interpolation) based on the measured Lab value sets already known for the RGB lattice points of the original RGB cubic spaces before the RGB cubic spaces were divided into smaller spaces. As a result, the personal computer 10 acquires the Lab value sets (measured Lab value sets) corresponding to RGB value sets of $129^3$ dolors (129 steps for each axis of the RGB color space).

Strictly speaking, equal intervals cannot be obtained when dividing each of the RGB values from 0 to 65535 in nine steps, since the difference between lattice points is 8192 from 0 to 57344 and 8191 from 57344 to 65535. Hence, while some of the RGB cubic spaces are not cubes in the strict sense of the word, these spaces will be treated as RGB cubic spaces in order to simplify the description.

As described above, the personal computer 10 obtains an RGB-to-Lab relationship indicating the relationship of the Lab value sets to the RGB value sets for the $129^3$ colors. Then, the personal computer 10 determines a Lab-to-RGB relationship indicating the relationship of the RGB value sets to the Lab value sets based on the RGB-to-Lab relationship. A color conversion table is created based on the Lab-to-RGB relationship.

More specifically, the color conversion table for the Lab-to-RGB relationship is prepared. The color conversion table for the Lab-to-RGB relationship includes data corresponding to vertices (Lab lattice points) of CIELAB cubic spaces defined by equally dividing the CIELAB color space, shown in FIG. 2A, along the three axes. The vertices of these CIELAB cubic spaces are set as input points in the table. In other words, the input points are set to lattice points distributed uniformly in the CIELAB color space. These input points will hereinafter be referred to as Lab lattice points. For the sake of description, the table (the CIELAB color space) will be rendered here as a two-dimensional Lab plane (an a-b plane). With consideration for computational precision, the storage capacity required for the color conversion table, computational load, and other factors, an appropriate division number, by which entire ranges of the Lab values, is 16 to 32, and more preferably 16 or 32, which values can be represented by $2^n$.

Figure 2A:
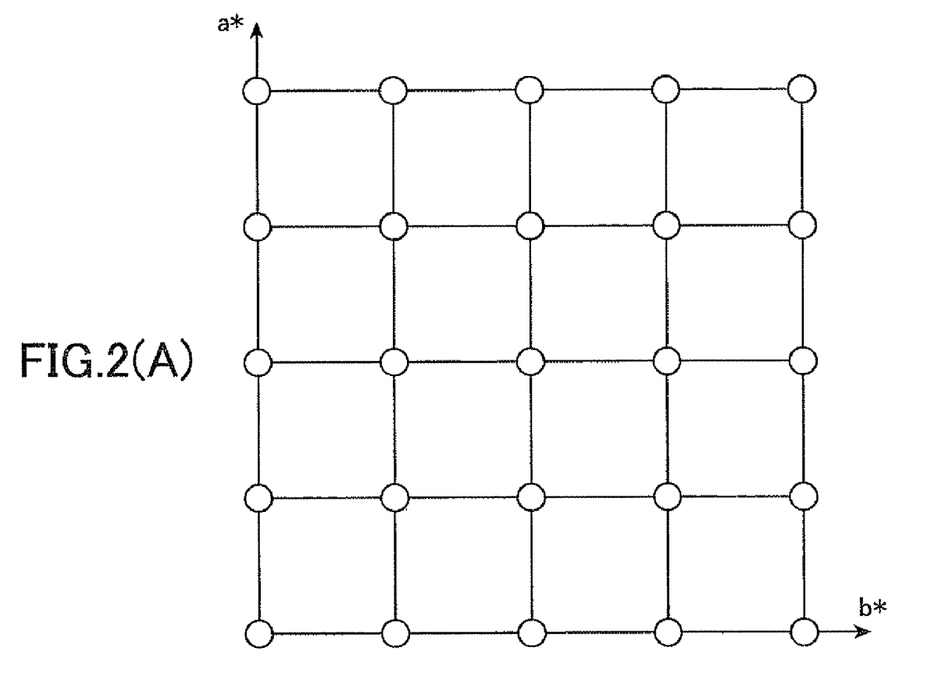
FIGS. 2A and 2B are explanatory diagrams for creating a Lab color conversion table according to the embodiment.

The color conversion table for the Lab-to-RGB relationship stores: a set of RGB values, a color difference, and a flag in correspondence with each of the Lab lattice points (each set of Lab values). The RGB value set for each Lab lattice point is a set of RGB conversion values defined in the RGB color space into which the Lab value set of the subject Lab lattice point should be converted. The color difference for each Lab lattice point indicates a color difference in the CIELAB color space as a distance between a set of Lab values for the corresponding RGB value set and the Lab value set of the subject Lab lattice point. The flag for each Lab lattice point is a color gamut flag indicating whether the subject Lab lattice point is included in a color gamut of a device. In the Lab values of the CIELAB color space, L value ranges from 0 to 100 (that is, $0 \leq L \leq 100$), a value and b value are equal to or greater than −128 and equal to or smaller than 127 (that is, $-128 \leq a$, $b \leq 127$). In this embodiment, color difference is calculated using the CIELAB color-difference formula shown in Equation (1) (CIE 1976 L*a*b* color-difference formula).

Equation (1)

$$\Delta E = \sqrt{\Delta L^{*2} + \Delta a^{*2} + \Delta b^{*2}} \tag{1}$$

The personal computer 10 initializes the color conversion table for the Lab-to-RGB relationship. More precisely, the color gamut flags for all Lab lattice points are turned off (thus, indicating that all Lab lattice points are not included in the color region of the device). Further, the color difference for each of the Lab lattice points is set to the maximum value (=sqrt ($100^2+256^2+256^2$), where sqrt( ) represents "square root") that the color difference can have in the CIELAB color space.

Figure 3:
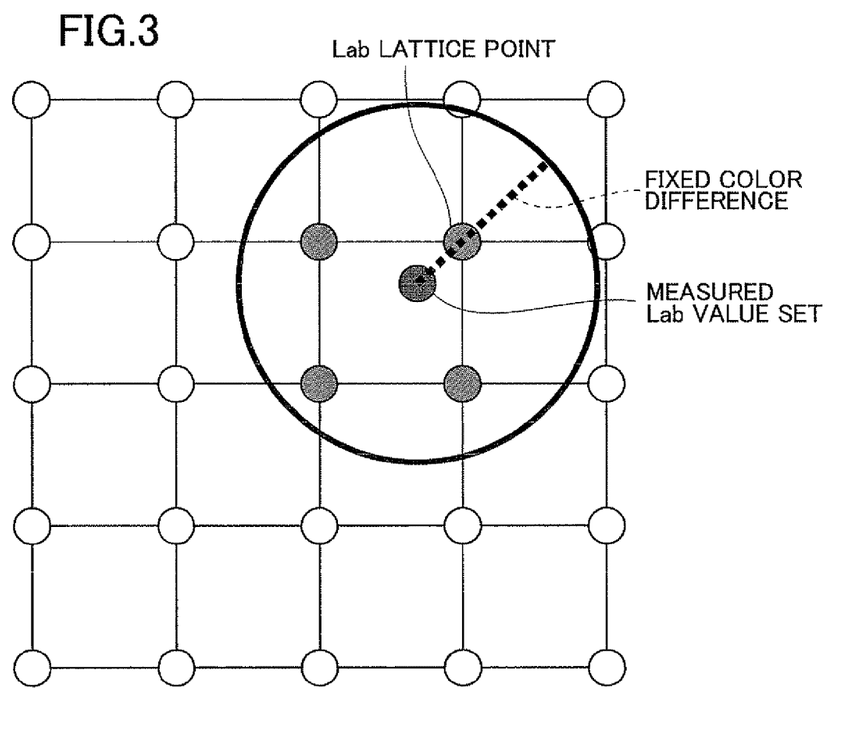
FIG. 3 is an explanatory diagram illustrating a method of searching for a plurality of Lab lattice points present within a fixed color difference from a measured Lab value set according to the embodiment.

Next, for each measured Lab value set corresponding to the RGB value sets for the $129^3$ colors, the personal computer 10 searches a plurality of Lab lattice points whose Lab value sets are near the measured Lab value set in the CIELAB color space (including at least an Lab lattice point nearest the subject measured Lab value set). More specifically, the personal computer 10 searches (or detects) the plurality of Lab lattice points within a spherical region no greater than a fixed color difference from the subject measured Lab value set, as shown in FIG. 3. The personal computer 10 calculates a color difference (distance in the CIELAB color space) between the subject measured Lab value set and each of the measured Lab value sets of the plurality of Lab lattice points. Each of the calculated color difference is compared with a color difference (whose initial value is the above-mentioned maximum value) that is registered at each of the plurality of the Lab lattice points at present. If the calculated color difference for one Lab lattice point is smaller than the color difference registered at the one Lab lattice point, the calculated color difference and the RGB value set, corresponding to the measured Lab value set, are rewritten over a color difference and an RGB value set registered at the one Lab lattice point, and the color gamut flag is turned on. In other words, the personal computer 10 registers, at each Lab lattice point, the RGB value set corresponding to the measured Lab value set having the smallest color difference from that Lab lattice point. Since the initial value of color difference is set to the maximum value, the calculated color difference may be rewritten over the initial value of the color difference without comparing the calculated color difference with the color difference already registered at the Lab lattice point, if the color gamut flag is off. Note that, the color gamut flag is used to determine the color gamut for a created color conversion table, though the flag does not directly related to this embodiment.

Figure 2B:
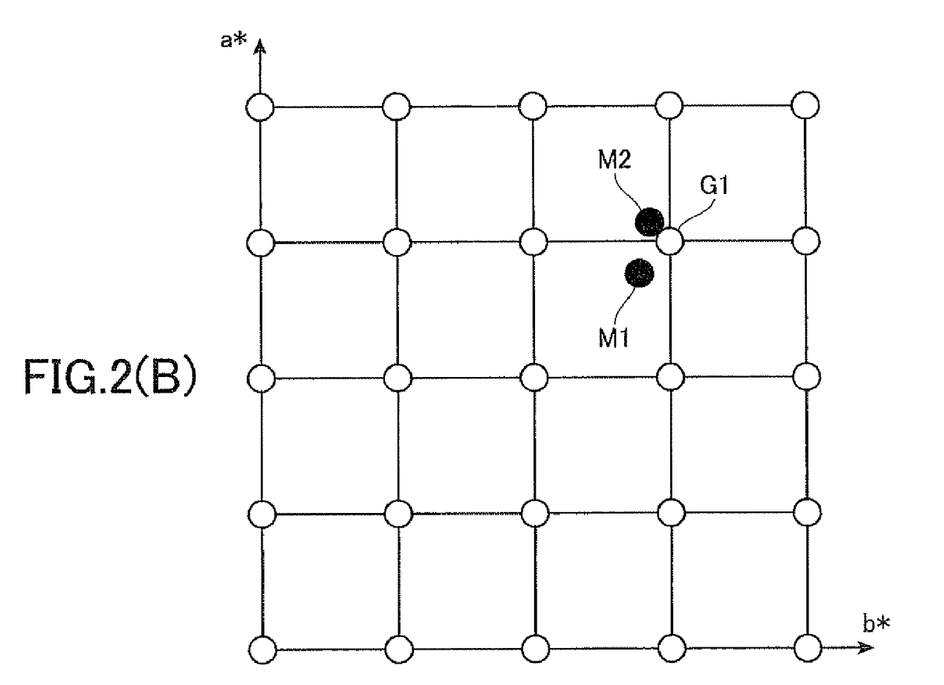

FIG. 23 shows an example in which the personal computer 10 retrieves a lattice point G1, which is one of the plurality of Lab lattice points near the measured Lab value set M1. If a color difference between the Lab value set at the lattice point G1 and the measured Lab value set M1 is smaller than a color difference registered at the lattice point G1 at this time, the smaller color difference is rewritten over the presently-registered valuer the RGB value set corresponding to the measured Lab value set M1 is registered at the lattice point G1, and the color region flag is turned on. This same process is performed for other Lab lattice points near the measured Lab value set M1. When the same process is subsequently performed for the measured Lab value set M2, which is closer to the lattice point G1 than the measured Lab value set M1, the personal computer 10 again updates the RGB value set and color difference registered at the lattice point G1.

The above process is performed for all measured Lab value sets corresponding to the RGB value sets of the $129^3$ colors. Since the personal computer 10 searches a plurality of Lab lattice points within the fixed color difference from the subject measured Lab value set in this embodiment, the personal computer 10 can register a set of RGB values at all Lab lattice points within the color gamut of the device. However, there is a possibility that the same RGB value set will be registered at a plurality of Lab lattice points. Hence, the personal computer 10 must perform a smoothing process to moderate irregularities in the RGB value sets registered at the Lab lattice points.

Figure 4:
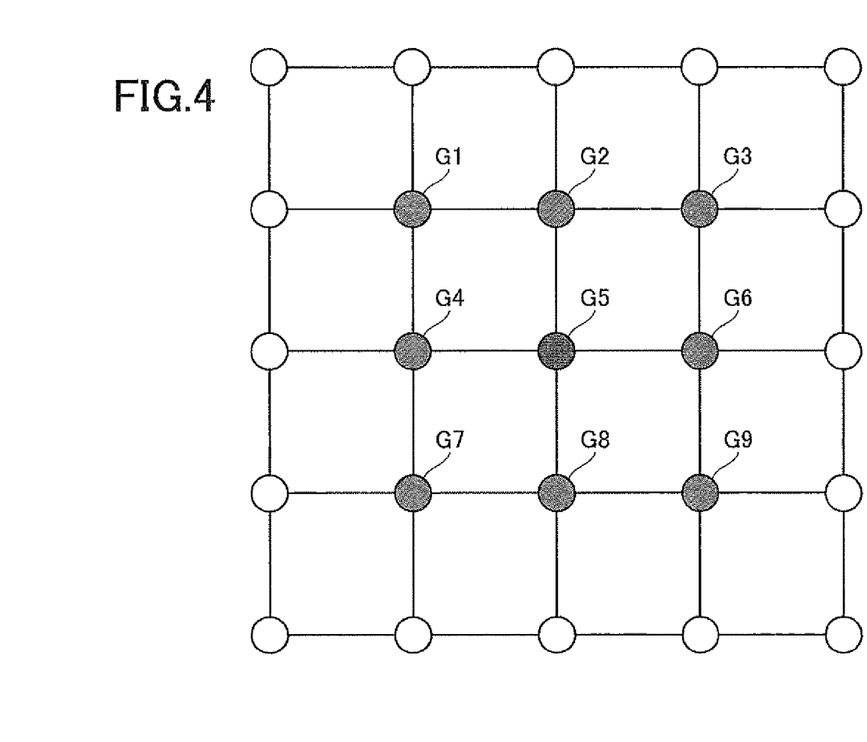
FIG. 4 is an explanatory diagram illustrating a smoothing process according to the embodiment.

FIG. 4 shows one example of a smoothing process. While the process is actually performed three-dimensionally, the process has been rendered in a two-dimensional Lab plane for the sake of description. In the smoothing process, the personal computer 10 corrects a set of RGB values registered at a targeted Lab lattice point based on the RGB value sets registered at the eight surrounding Lab lattice points. When using a 3×3 filter on lattice point G5, for example, the resulting value of the smoothing process is calculated by dividing the sum of RGB value sets for the nine lattice points G1-G9 by 9, as indicated in Equation (2). Equation (3) is used for a three-dimensional smoothing process.

Equation (2)
$$Out = \frac{\sum_{i=-1}^{1}\sum_{j=-1}^{1} In_{(i,j)}}{9} \quad (2)$$

Equation (3)
$$Out = \frac{\sum_{i=-1}^{1}\sum_{j=-1}^{1}\sum_{k=-1}^{1} In_{(i,j,k)}}{27} \quad (3)$$

However, the above process may not produce sufficiently small color difference for each Lab lattice point, i.e., may produce larger error. To reduce the color difference, it is necessary to set numerous interpolation points by performing finer interpolation (i.e., increasing the number of divisions in each RGB cubic space), but an increase in the number of interpolation points greatly lengthens the computation time.

Therefore, in this embodiment, the personal computer 10 repeatedly performs interpolation for each Lab lattice point while varying the registered RGB value set in order to obtain a set of RGB values whose a set of Lab values has a smaller color difference. Since the RGB lattice points are arranged at steps of about 512 (65536/128) in the RGB color space, it is highly probable that the RGB value set whose the measured Lab value set precisely corresponds to the Lab lattice point exist within the range of ±256 from the RGB value set registered at the Lab lattice point. Therefore, a set of RGB values that corresponds to a set of Lab values with a smaller color difference from the Lab lattice point are found by varying the registered RGB value set within this range. To do this, for each Lab lattice point, new RGB lattice points are distributed regularly in a new cubic space (or a subspace) of the RGB color space, the new cubic space encompassing the RGB lattice point corresponding to the RGB value set registered at the Lab lattice point and being bounded by intermediate points between the RGB lattice point and neighboring RGB lattice points.

However, if the RGB value set registered at the Lab lattice point are varied step by step in the ±256 range, the RGB value set would have to be varied $(256×2)^3$ times for each Lab lattice point, greatly increasing the calculation time. Therefore, a method of gradually reducing the step amount (128 steps→32 steps→8 steps→ . . . ) is employed, as will be described below. Further, a target color difference (d_target) is defined, and the process ends when a color difference of a set of RGB values has been smaller than the target color difference as described below.

Figure 5:
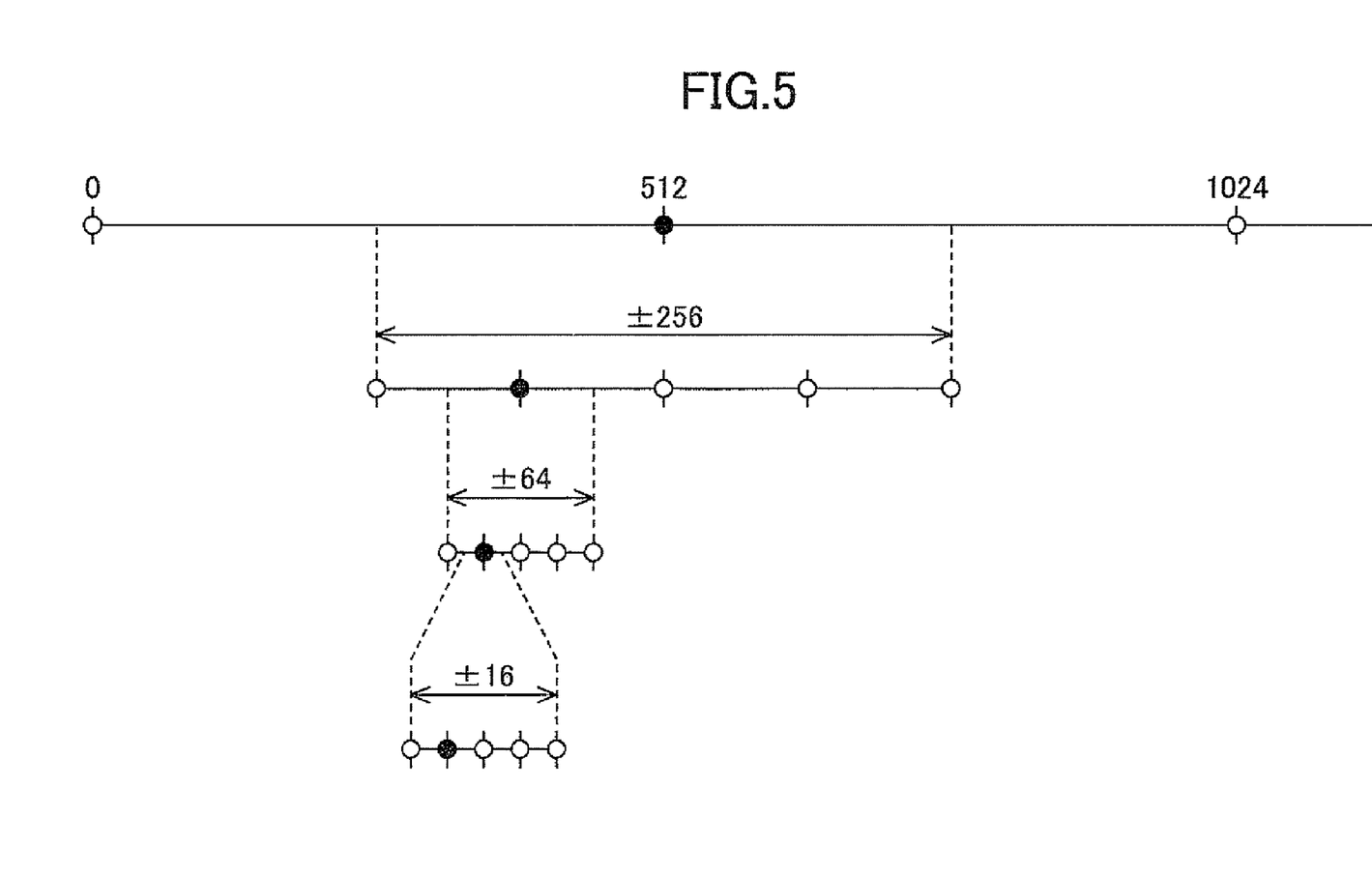
FIG. 5 is an explanatory diagram illustrating an interpolation method for repeatedly performing interpolations while varying RGB value set according to the embodiment.

In the example shown in FIG. 5, the personal computer 10 varies the RGB value set of the RGB lattice point (an initial RGB lattice point) registered at the Lab lattice point at steps of 128 within the ±256 range in the RGB color space. Next, a set of Lab values (or a measured Lab value set) in the CIELAB color space for a varied RGB lattice point is calculated based on a set of RGB values for the varied RGB lattice point through the interpolation. A color difference between the calculated Lab value set for the modified RGB lattice point and the Lab value set at the Lab lattice point is calculated. If the calculated color difference is smaller than the color difference registered at the Lab lattice point at this time, the calculated color difference and the RGB value set for the modified RGB lattice point are rewritten over the color difference and an RGB value set registered at the Lab lattice point. This process is repeated for all step variations within the ±256 range from the initial RGB lattice point. That is, as shown in FIG. 5, this process is performed at the RGB lattice points of the values 256, 384, 512, 640, and 768 if the RGB value set of the initial RGB lattice point is the value 512. Next, if a set of RGB values of the RGB lattice point at the value 384 is registered at the Lab lattice point as the modified RGB value set, this process is performed at the RGB lattice points of the values 320, 352, 384, 416, and 448. To simplify this description, the number of variations in FIG. 5 is shown conceptually for one dimension, and is thus 5, but the actual number of variations is $5^3$ since the RGB value set is varied three-dimensionally in the RGB color space. After completing 128 steps variations in the ±256 range from the initial RGB lattice point, the personal computer 10 next varies the modified RGB value set registered at the Lab lattice point in steps of 32 within a ±64 range. In other words, the personal computer 10 repeats the above process using one-fourth the variation range (64/256) and step size (32/128). This process is continued until the color difference falls below the target color difference.

Based on Color Handbook, 2nd edition, published on Jun. 10, 1998, "Classification of Tolerant Color Difference," Table 7.6, p. 290, and ASTM (1953): Method E 97-53 T, the target color difference in this embodiment is preferably 0.2. Since color differences cannot be measured within the range of 0.2 and less, there is little need to try to reduce the color difference further once a value of 0.2 or less is achieved Table 1 below shows the classifications of acceptable color differences.

TABLE 1

| Color Difference | Classification | Description |
| --- | --- | --- |
| ~0.2 | Unmeasurable | |
| 0.3 | Perceptible color difference | Measured color reproduction accuracy for identical object |
| 0.6 | Class 1 (precise color difference) | Practical level of tolerance when accounting for sources of error |
| 1.2 | Class 2 (practical color difference a) | Color difference can be easily distinguished by most people when two colors are placed side by side. Munsell's Class AAA Defense Agency's OD colors |
| 2.5 | Class 3 (practical color difference b) | Two colors can be perceived as nearly the same when viewed separately. Munsell's Class AA JIS standard color chart |
| 5 | Class 4 | Two colors can be perceived as nearly the same when viewed over time. Munsell's Class A |
| 10 | Class 5 | Marking pens (JIS S 6037-1992) |
| 20 | Class 6 | Managing colors at color name level General rules of coating films for automobile parts (JIS D 0202-1988) Color difference for railway crossing equipment (JIS E 3701-1984) Stamp pads (JIS S 6016-1991) Leads for pencils, color pencils, and mechanical pencils (JIS S 6005-1992) General rules for safety color (JIS Z 9109-1986) Identification marking for piping systems (JIS Z 9102-1987) Aerospace-Pipelines-Identification (JIS W 0601-1990) |

3. Processes Executed by Controller

Next, details of the process executed by the control unit 11 to implement the procedure for creating a color conversion table will be described.

Figure 6:
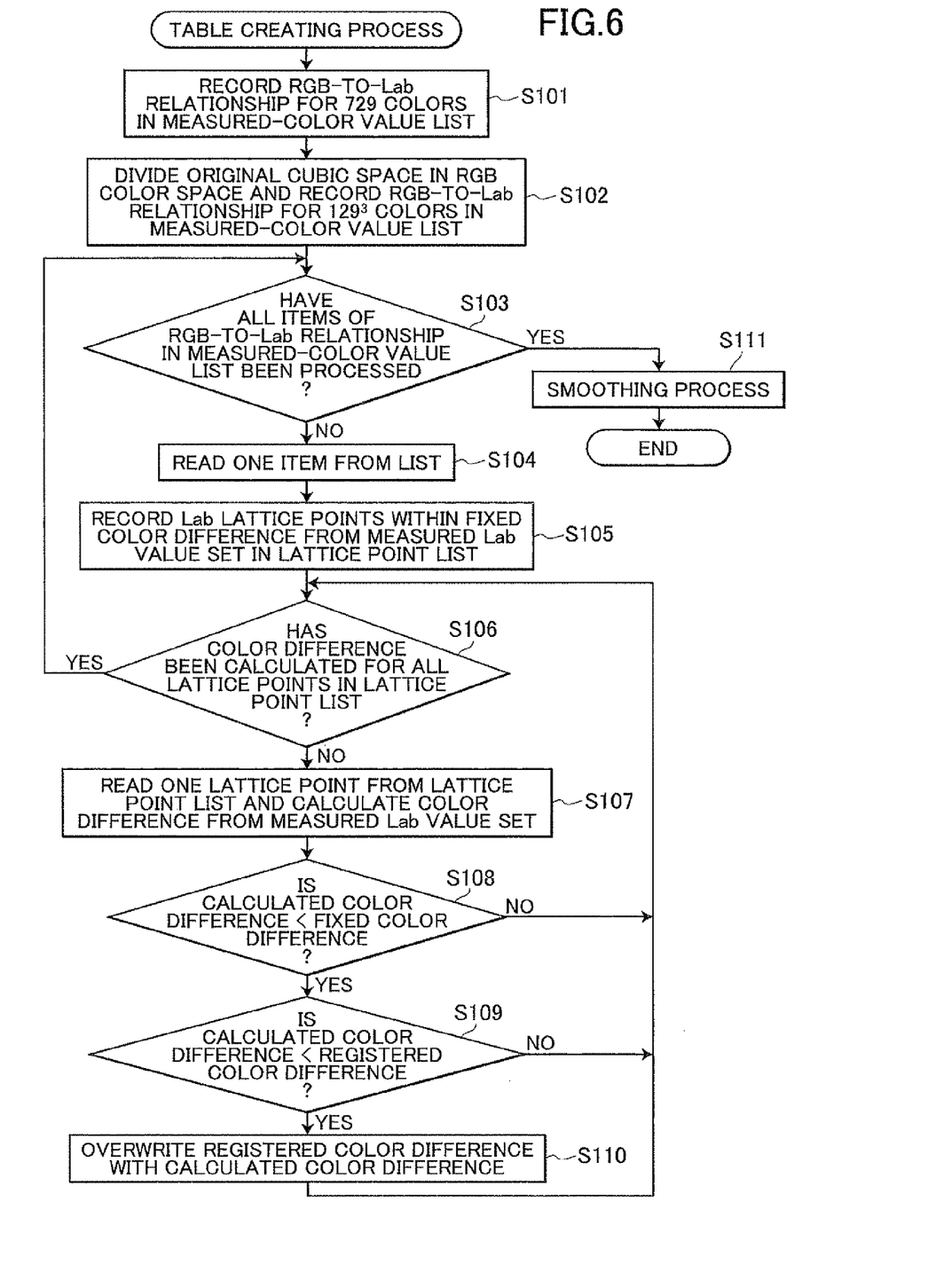
FIG. 6 is a flowchart illustrating steps in a table creating process according to the embodiment.

FIG. 6 is a flowchart illustrating steps in the conversion table creating process executed by the CPU 12 in the control unit 11 based on the conversion table creating program 22.

In S101 at the beginning of the conversion table creating process, the control unit 11 measures each of the 729 colors of the RGB color space in the printed color patch with the colorimeter 30 in order to obtain color values (a plurality of sets of Lab values in the CIELAB color space) for each of the 729 colors. Then, the control unit 11 records an RGB-to-Lab relationship in the measured-color value list 23 of the storage unit 19. The RGB-to-Lab relationship indicates the relationship of the measured Lab value sets to the RGB value sets for the 729 colors.

In S102 the control unit 11 further divides each RGB cubic space in the RGB color space having vertices defined by the RGB value sets of the color patch by 16 along each axis. Then, the control unit 11 sets the lattice points of the newly obtained RGB cubic spaces to interpolation points (new RGB lattice points). Further, the control unit 11 calculates a set of Lab values (measured Lab value set) in the CIELAB color space for each interpolation point through interpolation based on the measured Lab value sets already known for RGB lattice points of the original RGB cubic spaces, and adds these measured Lab value sets to the measured-color value list 23. Through this process, an RGB-to-Lab relationship for $129^3$ colors is recorded in the measured-color value list 23.

In S103 the control unit 11 determines whether the process in S104-S106 described later has been performed for all items in one to one correspondence with all lattice points in the RGB-to-Lab relationship for the $129^3$ colors recorded in the measured-color value list 23. If the control unit 11 determines in S103 that the process has not been performed for all items in the measured-color value list 23 (i.e., there exist unprocessed items), in S104 the control unit 11 reads one of the plurality of items (one relationship between the measured Lab value set and the RGB value set) recorded in the measured-color value list 23. Eventually all items recorded in the measured-color value list 23 will be processed by repeatedly performing the process in S104-S106 a number of times equivalent to the number of items. Accordingly, the control unit 11 reads one of the unprocessed items in S104 based on a prescribed rule (order).

In S105 the control unit 11 identifies a plurality of Lab lattice points within the fixed color difference from the measured Lab value set of the item read in S104 and records the identified plurality of Lab lattice points in the lattice point list 24. The lattice point list 24 functions to temporarily store information on the identified plurality of Lab lattice points.

The control unit 11 identifies the plurality of Lab lattice points within the fixed color difference in S105 according to the following process. Using a* as an example, the control unit 11 identifies the plurality of Lab lattice points in the range from $int((a2-dE)/da)$ to $int((a2+dE)/da)$, where a2 is the measured Lab value set read in S104, da is the distance between a Lab point corresponding to the measured Lab value set of the one item read in S104 and each of the plurality of Lab lattice points, and dE is the fixed color difference. Here, int( ) denotes an integer obtained by truncating values to the right of the decimal.

By performing the same process for L* and b*, all Lab lattice points identified within the range of the fixed color difference in each three-dimensional direction (all Lab lattice points included in a CIELAB cubic space defined by the fixed color difference dE) are determined to be target Lab lattice points existing within the fixed color difference from the Lab point corresponding to the measured Lab value set read in S104.

Although some target Lab lattice points stored in S105, such as those positioned on vertices of the CIELAB cubic space defined by the fixed color difference, may not exactly fall within the fixed color difference, in order to shorten the process in S105 a more accurate determination is executed later in S108. Therefore, at the S105 stage, any of the target Lab lattice points that do not precise fall within the fixed color difference may be recorded in the lattice point list 24. Of course it is also possible to perform color difference calculation in S105 to determine accurately whether the Lab lattice point falls within the fixed color difference, but since the color difference calculation is also performed in S107 below, an accurate determination can be made after S105 and thus the present procedure is used in this embodiment. Hence, the lattice point list 24 created in S105 may be more correctly referred to as a list of candidate Lab lattice points that fall within the fixed color difference from the measured Lab value set read in S104.

Further, the fixed color difference dE is set to a value encompassing all Lab lattice points constituting one CIELAB cubic space (a smallest cubic space formed from eight Lab lattice points in the CIELAB color space) that contains the measured Lab value set read in S104, and more specifically to a value no less than sqrt($dL^2+da^2+db^2$), where dL, da, and db are distances between one Lab lattice point of the eight Lab lattice points and a farthest Lab lattice point from the one Lab lattice point. That is, the fixed color difference dE is set to the length of a diagonal line of the CIELAB cubic space.

Although the CIELAB color difference formula is used in this embodiment, a different color difference formula may be employed. However, since Lab lattice points are used in this embodiment, a color difference formula other than the CIELAB color difference formula may miss some Lab lattice points positioned inside the CIELAB cubic space and include other Lab lattice points within the color difference but outside the CIELAB cubic space. For example, the CIE 2000 color difference formula expands the range for identifying color difference along a color saturation direction in high color saturation, sometimes existing a range of the fixed color difference outside the CIELAB cubic space. As a result, it is necessary to perform a process to set the CIELAB cubic space to a slightly larger value than the fixed color difference and to ignore points existing outside the CIELAB cubic space.

In S106 the control unit 11 determines whether the process in S107-S110 described later has been performed for all of the plurality of Lab lattice points recorded in the lattice point list 24. The control unit 11 returns to S103 when determining in S106 that the process has been completed for all of the plurality of Lab lattice points.

However, when the control unit 11 determines in S106 that the process in S107-S110 has not been performed for all of the plurality of Lab lattice points (i.e., there remain unprocessed Lab lattice points), in S107 the control unit 11 reads a single Lab lattice point from among the plurality of Lab lattice points recorded in the lattice point list 24 and calculates a color difference between a set of Lab values of the read Lab lattice point and the measured Lab value set for the item read in S104. Eventually, the process in S107-S110 will be performed for all of the plurality of Lab lattice points recorded in the lattice point list 24 by repeatedly performing the process a number of times equivalent to the number of points recorded in the lattice point list 24. Accordingly, the control unit 11 reads one of the unprocessed Lab lattice points in S107 according to a prescribed rule (order).

In S108 the control unit 11 determines whether the color difference calculated in S107 is less than the fixed color difference dE (the same value used in S105). If the calculated color difference is smaller than the fixed color difference dE, in S109 the control unit 11 determines whether the color difference calculated in S107 is less than a registered color difference registered at the Lab lattice point read in S107. As described earlier, corresponding a set of RGB values, a color difference, and a color gamut flag are registered at each Lab lattice point in the CIELAB color space. The initial registered color difference is set to the maximum value (maximum color difference) that can be obtained in the CIELAB color space.

If the control unit 11 determines in S109 that the calculated color difference in S107 is smaller than the registered color difference, in S110 the control unit 11 overwrites (updates) the registered color difference with the calculated color difference. Subsequently, the control unit 11 returns to S106.

However, if the control unit 11 determines in S108 that the calculated color difference is not smaller than the fixed color difference dE or if the control unit 11 determines in S109 that the calculated color difference is not smaller than the registered color difference, then the control unit 11 returns to S106 without updating the registered color difference.

When the control unit 11 determines in S103 that the process has been performed for all items, in S111 the control unit 11 performs the smoothing process described earlier and subsequently ends the conversion table creating process.

Figure 7:
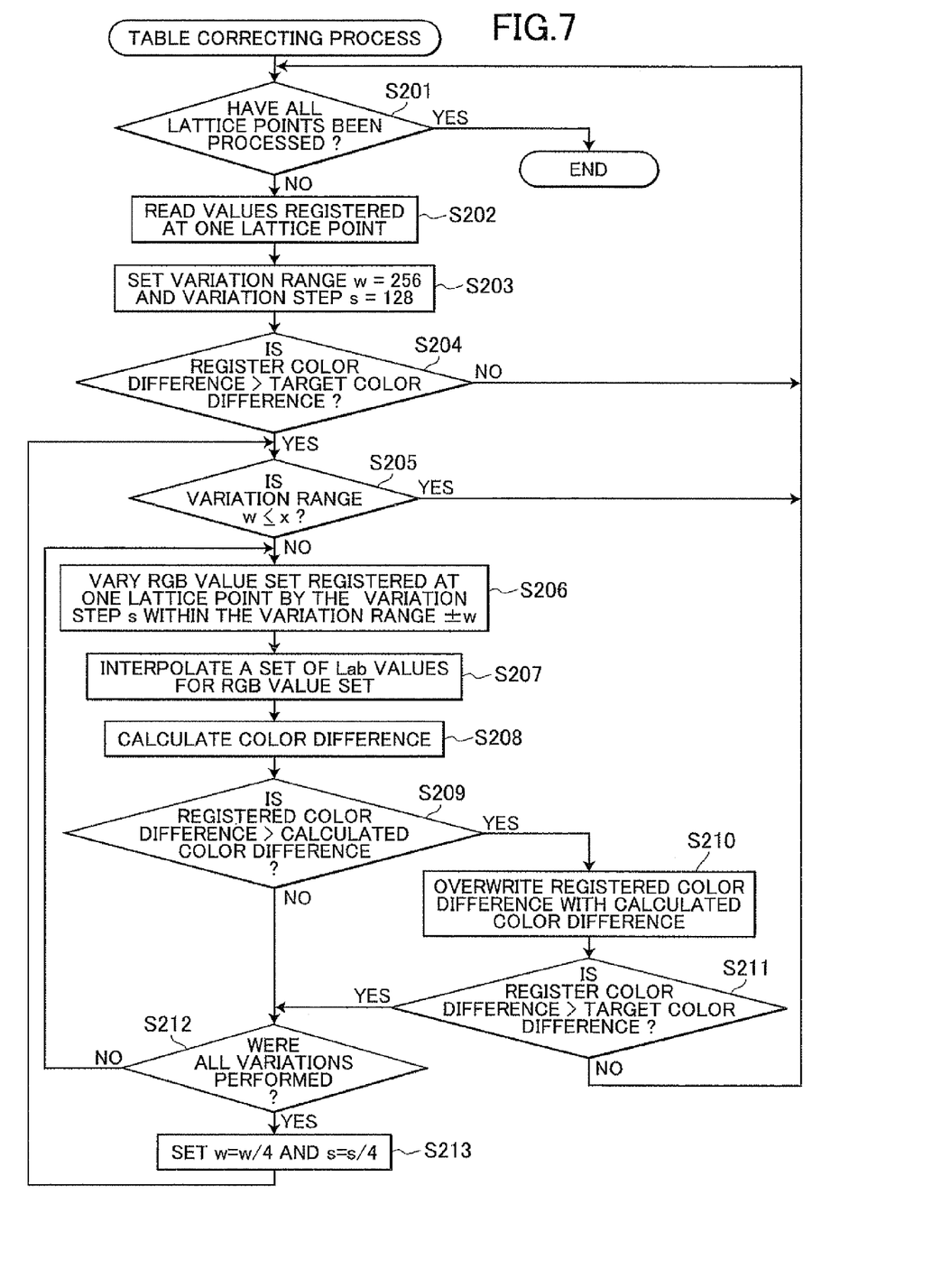
FIG. 7 is a flowchart illustrating steps in a table correcting process according to the embodiment.

Next, a conversion table correcting process executed after completing the conversion table creating process will be described with reference to the flowchart in FIG. 7. At the beginning of the conversion table correcting process in S201, the control unit 11 determines whether the process in S202-S213 described later has been performed for all Lab lattice points in the CIELAB color space.

If the control unit 11 determines in S201 that not all of the Lab lattice points have been processed (there remain unprocessed Lab lattice points), in S202 the control unit 11 selects one Lab lattice point from the all of Lab lattice points and reads a color difference and a set of RGB values registered at the one Lab lattice point. Eventually, the all of Lab lattice points will be processed in this table correcting process by repeatedly performing the process in S202-S213 a number of times equivalent to the number of Lab lattice points. Therefore, in S202 the control unit 11 selects an unprocessed Lab lattice point according to a prescribed rule (order).

In S203 the control unit 11 initializes a variation range w to 256 and a variation step s to 128 (i.e. w=256 and s=128). In S204 the control unit 11 determines whether the color difference registered at the one Lab lattice point selected in S202 (the registered color difference) is greater than the target color difference.

The control unit 11 returns to S201 when determining in S204 that the registered color difference is not greater than (is less than or equal to) the target color difference. However, if the control unit 11 determines in S204 that the registered color difference is greater than the target color difference, in S205 the control unit 11 determines whether the variation range w is less than or equal to a preset threshold x (16 in this embodiment).

If the control unit 11 determines in S205 that the variation range w is greater than the threshold x, in S206 the control unit 11 varies the RGB value set registered at the one Lab lattice point selected in S202 by the variation step s within the range ±w from the RGB value set. Eventually, the control unit 11 processes all RGB value sets obtained by repeatedly varying the RGB value set at the variation step s within the range ±w in S206-S212 while the registered color difference is higher than the target color difference, as will be described later. Therefore, the control unit 11 varies the processed RGB value set to a new RGB value set in S206 according to a prescribed rule (order).

In S207 the control unit 11 calculates a set of Lab values (a measured Lab value set) for the varied RGB value set through interpolation. In S208 the control unit 11 calculates a color difference between the Lab value set for the one Lab lattice point selected in S202 and the measured Lab value set calculated in S207.

In S209 the control unit 11 determines whether the color difference calculated in S208 (calculated color difference) is less than the color difference registered at the one Lab lattice point selected in S202 (registered color difference). If the control unit 11 determines in S209 that the calculated color difference is less than the registered color difference, in S210 the control unit 11 replaces (updates) the registered color difference with the calculated color difference.

In S211 the control unit 11 determines whether the updated registered color difference is greater than the target color difference. The control unit 11 advances to S212 upon determining in S211 that the updated registered color difference is greater than the target color difference. The control unit 11 skips S210 and S211 and advances directly to S212 upon determining in S209 that the calculated color difference is not smaller than the recorded color difference.

In S212 the control unit 11 determines whether the process for varying the RGB value set within the range ±w is completed (whether the process in S206-S211 has been repeated $5^3$ times). If the control unit 11 determines in S212 that the process to vary the RGB value set within the range ±w has not been completed, in S206 the control unit 11 continues this process.

However, if the control unit 11 determines that the process to vary the RGB value set has been completed, in S213 the control unit 11 updates the variation range w and the variation step s to one-fourth their current values (w=w/4 and s=s/4) and returns to S205.

The control unit 11 also returns to S201 upon determining in S211 that the updated registered color difference is not greater than the target color difference (is less than or equal to the target color difference) and upon determining in S205 that the variation range w is less than or equal to the threshold x.

The control unit 11 ends the current conversion table correcting process after determining in S201 that all Lab lattice points have been processed.

4. Effects

As described above, the personal computer 10 according to this embodiment identifies a plurality of Lab lattice points located near each measured Lab value set for $129^3$ RGB lattice points in the CIELAB color space (within the fixed color difference from each measure Lab value set), and calculates a plurality of color differences between each measured Lab value set and the plurality of Lab lattice points. Further, at each Lab lattice point, the personal computer 10 registers a set of RGB values corresponding to one of the measured Lab value sets having the smallest color difference from each Lab lattice point (S103-S110).

Subsequently, for each Lab lattice point, the personal computer 10 according to this embodiment distributes new RGB lattice points regularly in the new cubic space of the RGB color space, the new cubic space encompassing a single RGB lattice point corresponding to the RGB value set registered at the Lab lattice point but not including other RGB lattice points. When there exists one new RGB lattice point of the new RGB lattice points whose a measured Lab value set has a smaller color difference from the Lab lattice point, the personal computer 10 performs an updating process to update the registered RGB value set to a set of RGB values of the one new RGB lattice point and corrects all registered RGB value sets by repeatedly performing this updating process (S201-S213) for each Lab lattice point.

Accordingly, the personal computer 10 can more efficiently set a set of RGB values that accurately corresponds to the Lab lattice point (have a small color difference from the Lab lattice point), thereby efficiently improving the color conversion accuracy of the color conversion table.

In particular, for each Lab lattice point, the personal computer 10 according to this embodiment distributes new RGB lattice points regularly in the new cubic space of the RGB color space, the new cubic space encompassing a single RGB lattice point corresponding to the RGB value set registered at the Lab lattice point and being bounded by intermediate points between the single RGB lattice point and other neighboring RGB lattice points. Therefore, the new RGB lattice points can be efficiently set in the RGB cubic space with a high probability of including a set of RGB values that correspond most precisely to the Lab lattice point.

Moreover, the personal computer 10 according to this embodiment does not perform the updating process on the Lab lattice point whose the registered color difference is no greater than the target color difference and ends the updating process when the registered color difference drops to or below the target color difference through the updating process. Hence, the personal computer 10 avoids needlessly performing the updating process.

In addition, the personal computer 10 according to this embodiment restricts the number of times, that the updating process is repeated, by ending the updating process when the variation range w is no greater than the threshold x, thereby not repeating the updating process more than necessary, regardless of the value of the color difference. In other words, while the color difference should decrease is by repeatedly performing the updating process, the effectiveness of the updating process (degree to which the color difference is reduced) grows less as the updating process is repeated. If the personal computer 10 were to always repeat the updating process until the color difference dropped below the target color difference, the number of repetitions for the updating process would become quite large when the color difference is more difficult to reduce, resulting in a lengthy processing time not commensurate with the small effect. By providing a restriction to the number of times the updating process is repeated in this embodiment, processing efficiency can be improved.

5. Variations of the Embodiment

While the invention has been described in detail with reference to specific embodiments thereof, it would be apparent to those skilled in the art that many modifications and variations may be made therein without departing from the spirit of the invention, the scope of which is defined by the attached claims.

In the above embodiment, in S105 the control unit 11 identifies a plurality of Lab lattice points within the fixed color difference from the measured Lab value set of the item read in S104 and records the identified plurality of Lab lattice points in the lattice point list 24, but this embodiment is not limited to this. For example, in S105 a single Lab lattice point whose Lab value set is the closest to the one measured Lab value set read in S104, may be determined. Subsequently, the control unit 11 skips S106 and in S107 calculate a color difference between the measured one Lab value set read in S104 and the Lab value set of the single Lab lattice point identified in S105 in the CIELAB color space. Further, the control unit 11 skips S108 and in S109 determines whether the color difference calculated in S107 is less than a registered color difference registered at the single Lab lattice point determined in S105. Then, the conversion table correcting process is executed with respect to all single Lab lattice points identified in S105.

For example, the target color difference is not limited to 0.2 used in this embodiment, but may be set arbitrarily with consideration for the desired processing time and memory usage.

Further, while the color difference registered at each Lab lattice point is set to the maximum value possible in the CIELAB color space when initializing the Lab color conversion table in this embodiment, the color difference for each Lab lattice point may be initialized to another value, such as a value that is not possible.

Further, in this embodiment described above, the variation range w is initialized to 256 and the variation step s is initialized to 128, but this embodiment is not limited to these values.

For example, in FIG. 5 the RGB lattice point at the value 512 is varied within the range 256-768, but this RGB lattice point may be varied within a range from 1 to 1023 (i.e., the maximum cubic space that encompasses the RGB lattice point but does not include other RGB lattice points.

Further, in this embodiment described above, an interpolation process is repeatedly performed while varying the RGB value set for each Lab lattice point in order to find the most suitable value set after performing the smoothing process, but the process to create the color conversion table may be ended after completing the smoothing process (i.e., the conversion table creating process in FIG. 7 may be skipped), thereby simplifying the conversion table correcting process. The conversion table creating process may be further simplified by skipping the smoothing process.

Further, in this embodiment described above, the personal computer 10 calculates the $129^3$ measured Lab value sets for the RGB value sets of $129^3$ colors (129 steps for each axis of the RGB color space) through interpolation based on the 729 measured Lab lattice points for 729 colors, but this embodiment is not limited to this. For example, fewer interpolation points may be used (17 steps or 33 steps, for example) or more interpolation points. Alternatively, instead of finding interpolation points, the personal computer 10 may instead initially find the RGB-to-Lab relationship between the Lab value sets and the corresponding RGB value sets based solely on the 729 measured Lab value sets.

In this described above, the fixed color difference dE is set to a value greater than or equal to $sqrt(dL^2+da^2+db^2)$, which is the length of a diagonal line of the CIELAB cubic space to which the measured Lab value set is included, but this embodiment is not limited to this configuration. For example, the fixed color difference dE may be set to a color difference between neighboring RGB lattice points in the RGB color space. In this case, all Lab lattice points belonging to the color gamut of the device can be efficiently found in a region within the set fixed color difference from a measured Lab value set at an RGB lattice point.

However, since the color difference varies between RGB lattice points, the fixed color difference dE should be set according to one of the following methods (1)-(4).

(1) The fixed color difference dE' is set to the average color difference among color differences between all adjacent RGB lattice points in the RGB color space. This method can reduce computation time since a common fixed color difference dE' is used for all measured Lab value sets. Further, since the region within the fixed color difference from a measure Lab value set will not become excessively large when using the average value of color differences, this method makes it possible to efficiently identify Lab lattice points located near the measured Lab value set while suppressing an increase in computation time.

(2) The fixed color difference dE' is set to the maximum color difference among color differences between all neighboring RGB lattice points in the RGB color space. This method can reduce computation time as in the method (1) described above, since a common fixed color difference dE' is used for all measured Lab value sets. Further, by using the maximum color difference, it is less likely that a set of RGB values are not registered at a Lab lattice point present within the color gamut of the device, even when the color differences between RGB lattice points in the RGB color space varies greatly.

(3) The fixed color difference dE' is set to the average color difference among color differences between an RGB lattice point corresponding to a measured Lab value set and six RGB lattice points neighboring this RGB lattice point in the RGB color space, for each measured Lab value set. By setting the fixed color difference dE' to a value according to the measure Lab value set in this method, Lab lattice points located near the measured Lab value set can be more efficiently identified, while reducing a case that a set of RGB values is not registered at a Lab lattice point present within the color gamut of the device, even when there is a great variation in color differences between RGB lattice points in the RGB color space. Further, since the region within the fixed color difference from a measure Lab value set will not become excessively large when using the average value of color differences, this method makes it possible to efficiently identify Lab lattice points located near the measured Lab value set while suppressing an increase in the computation time.

(4) The fixed color difference dE' is set to the maximum value among color differences between an RGB lattice point corresponding to a measured Lab value set and six RGB lattice points neighboring this RGB lattice point in the RGB color space, for each measured Lab value set. By setting the fixed color difference dE' to a value according to the measure Lab value set in this method, as in method (3) described above, Lab lattice points located near the measured Lab value set can be more efficiently identified, while reducing a case that a set of RGB values is not registered at a Lab lattice point present within the color gamut of the device, even when there is a great variation in color differences between RGB lattice points in the RGB color space. Further, by using the maximum color difference, it is possible to further reduce the case that the RGB value set is not registered at the Lab lattice point present within the color gamut of the device.

The meaning of six neighboring RGB lattice points mentioned above is as follows. When each axis of the RGB color space is divided into eight sections in this embodiment, if a set of RGB values is expressed in 8 bits, then the nine steps of the RGB value set are expressed by 0, 32, 64, 96, 128, 160, 192, 224, and 255. Thus, six neighboring lattice points to the lattice point expressed by RGB (32, 64, 128), for example, are (0, 64, 128), (64, 64, 128), (32, 32, 128), (32, 96, 128), (32, 64, 96), and (32, 64, 160).

Note, this embodiment is not limited to six neighboring lattice points, but may employ twenty-six neighboring lattice points, or the eighteen neighboring lattice points from among these twenty-six that exclude the eight vertices.

On the other hand, this embodiment is not limited to calculate color differences between a measured Lab value set and Lab lattice points located within a fixed color difference from the measured Lab value set. For example, it is possible to divide the CIELAB color space into a plurality of CIELAB cubic spaces with Lab lattice points serving as vertices (the smallest cubic spaces formed of eight Lab lattice points) and to calculate color differences between the measured Lab value set and eight Lab lattice points serving as vertices of the CIELAB cubic space in which the measured Lab value set is included. That is, eight Lab lattice points constituting the CIELAB cubic space in which the measured Lab value set is included, are set as the target Lab lattice points. This method can reduce calculation time since the eight Lab lattice points located near the measured Lab value set are easy to identify.

Further, while the CIELAB color-difference formula was applied in this embodiment described above, another color-difference formula may be used, such as the CMC color-difference formula, CIE94 color-difference formula, and CIEDE2000 color-difference formula.

While the device is the color printer 40, and the color space that depends on the device characteristics is the RGB color space, this embodiment may be applied to a device having the CMY color space, YCC color space, or the like as a color space that depends on a device characteristics. Further, the color space is not limited to three dimensional space. The same effects can be obtained in a four-dimensional color space or greater, such as the CMYK color space.

Further, the CIELAB color space is described as the color space that does not depends on the device characteristics, but this embodiment may be applied to the Lab color space, CIEXYZ color space, CIECAM02 color space, and the like.

What is claimed is:

1. A conversion table creating device for creating a color conversion table for converting a set of first color data defined in a first color space, that is a uniform color space, to a set of second color data defined in a second color space different from the first color space, the conversion table creating device comprising:
   a first reference point setting unit that sets a plurality of first reference points that are uniformly distributed in the first color space, each of the plurality of first reference points being defined by a set of third color data that is defined in the first color space;
   a second reference point setting unit that sets a plurality of second reference points that are uniformly distributed in the second color space, each of the plurality of second reference points being defined by a set of fourth color data that is defined in the second color space;
   a color data setting unit that sets a plurality of sets of fifth color data that are defined in the first color space in one to one correspondence with the plurality of fourth color data sets;
   an identifying unit that identifies a single first reference point, that is closest to the fifth color data set for each of the second reference points;
   a calculation unit that calculates, for each of all the second reference points, a color difference between the fifth color data set for the each second reference point and the single first reference point that is identified by the identifying unit for the each second reference point;
   a determining unit that determines, for each of the single first reference points, a single fifth color data set that has the smallest color difference from the single first reference point among all the color differences that are calculated with respect to the single first reference point by the calculating unit;
   a registering unit that registers, at each of the single first reference points, the fourth color data set that is set in correspondence with the single fifth color data sets that is determined by the determining unit;
   a first judging unit;
   an updating unit; and
   an update performing unit that repeatedly performs an updating process for each of the single first reference points,
   wherein the update performing unit performs the updating process by controlling (1) the second reference point setting unit to further set a plurality of second reference points that are uniformly distributed in a subspace in the second color space, the subspace encompassing only a single one among the plurality of second reference points already set by the second reference point setting unit, the fourth color data set of the single second reference point being registered at the single first reference point, each of the plurality of second reference points in the subspace being defined by a set of fourth color data that is defined in the second color space; (2) the color data setting unit to set a plurality of sets of fifth color data that are defined in the first color space in one to one correspondence with the plurality of fourth color data sets of the second reference points in the subspace; (3) the calculation unit to calculate, for each of all the second reference points in the subspace, color differences between the fifth color data set for each second reference point in the subspace and the single first reference point, at which the fourth color data set of the single second reference point is registered; (4) the first judging unit to judge whether or not the smallest color difference among all the color differences that are calculated with respect to each of the second reference points in the subspace is smaller than the color difference between the fifth color data set in correspondence with the fourth color data set of the single second reference point and the single first reference point, at which the fourth color data set of the single second reference point is registered; and (5) the updating unit to update, if the first judging unit judges that the smallest color difference among all the color differences is smaller than the color difference between the fifth color data set in correspondence with the fourth color data set of the single second reference point and the single first reference point, at which the fourth color data set of the single second reference point is registered, the fourth color data set, that is already registered at the single first reference point, to the fourth color data set that is set in correspondence with the fifth color data set having the smallest color difference among all the color differences that are calculated with respect to the each second reference point in the subspace.

2. The conversion table creating device according to claim 1, wherein the subspace is bounded by intermediate points between the single second reference point and other second reference points, that are already set by the second reference point setting unit adjacent to the single second reference point.

3. The conversion table creating device according to claim 1, further comprising a second judging unit that judges whether or not the color difference between the fifth color data set in correspondence with the fourth color data set of the single second reference point and the first reference point, at which the fourth color data set of the single second reference point is registered is greater than a prescribed target color difference,
   wherein the update performing unit performs the updating process if the second judging unit judges that the smallest color difference of the fifth color data set in correspondence with the fourth color data set of the single second reference point is greater than the prescribed target color difference.

4. The conversion table creating device according to claim 3, wherein the update performing unit ends the updating process if the second judging unit judges that the smallest color difference of the fifth color data set in correspondence with the fourth color data set of the single second reference point is equal to or smaller than the prescribed target color difference.

5. The conversion table creating device according to claim 1, wherein the update performing unit has a restriction on the number of times the updating process is repeated.

6. A computer-readable storage medium storing a computer-executable conversion table creating program for a conversion table creating device, the conversion table creating device creating a color conversion table for converting a set of first color data defined in a first color space, that is a uniform color space, to a set of second color data defined in a second color space different from the first color space, the conversion table creating program comprising:

instructions for setting a plurality of first reference points that are uniformly distributed in the first color space, each of the plurality of first reference points being defined by a set of third color data that is defined in the first color space;

instructions for setting a plurality of second reference points that are uniformly distributed in the second color space, each of the plurality of second reference points being defined by a set of fourth color data that is defined in the second color space;

instructions for setting a plurality of sets of fifth color data that are defined in the first color space in one to one correspondence with the plurality of fourth color data sets;

instructions for identifying a single first reference point, that is closest to the fifth color data set for each of the second reference points;

instructions for calculating, for each of all the second reference points, a color difference between the fifth color data set for the each second reference point and the single first reference point that is identified in the identifying instructions for the each second reference point;

instructions for determining, for each of the single first reference points, a single fifth color data set that has the smallest color difference from the single first reference point among all the color differences that are calculated with respect to the single first reference point in the calculating instructions;

instructions for registering, at each of the single first reference points, the fourth color data set that is set in correspondence with the single fifth color data sets that is determined in the determining instructions; and instructions for repeatedly performing an updating process for each of the single first reference points, wherein the updating process is performed (1) to further set a plurality of second reference points that are uniformly distributed in a subspace in the second color space, the subspace encompassing only a single one among the plurality of second reference points already set in response to the instructions for setting the plurality of second reference points, the fourth color data set of the single second reference point being registered at the single first reference point, each of the plurality of second reference points in the subspace being defined by a set of fourth color data that is defined in the second color space; (2) to set a plurality of sets of fifth color data that are defined in the first color space in one to one correspondence with the plurality of fourth color data sets of the second reference points in the subspace; (3) to calculate, for each of all the second reference points in the subspace, color differences between the fifth color data set for each second reference point in the subspace and the single first reference point, at which the fourth color data set of the single second reference point is registered; (4) to judge whether or not the smallest color difference among all the color differences that are calculated with respect to each of the second reference points in the subspace is smaller than the color difference between the fifth color data set in correspondence with the fourth color data set of the single second reference point and the single first reference point, at which the fourth color data set of the single second reference point is registered; and (5) to update, if the smallest color difference among all the color differences is smaller than the color difference between the fifth color data set in correspondence with the fourth color data set of the single second reference point and the single first reference point, at which the fourth color data set of the single second reference point is registered, the fourth color data set, that is already registered at the single first reference point, to the fourth color data set that is set in correspondence with the fifth color data set having the smallest color difference among all the color differences that are calculated with respect to the each second reference point in the subspace.

7. A conversion table creating method for a conversion table creating device, the conversion table creating device creating a color conversion table for converting a set of first color data defined in a first color space, that is a uniform color space, to a set of second color data defined in a second color space different from the first color space, the conversion table creating method comprising:

setting a plurality of first reference points that are uniformly distributed in the first color space, each of the plurality of first reference points being defined by a set of third color data that is defined in the first color space;

setting a plurality of second reference points that are uniformly distributed in the second color space, each of the plurality of second reference points being defined by a set of fourth color data that is defined in the second color space;

setting a plurality of sets of fifth color data that are defined in the first color space in one to one correspondence with the plurality of fourth color data sets;

identifying a single first reference point, that is closest to the fifth color data set for each of the second reference points;

calculating, using a personal computer, for each of all the second reference points, a color difference between the fifth color data set for the each second reference point and the single first reference point that is identified in the identifying instructions for the each second reference point;

determining, for each of the single first reference points, a single fifth color data set that has the smallest color difference from the single first reference point among all the color differences that are calculated with respect to the single first reference point in the calculating instructions;

registering, at each of the single first reference points, the fourth color data set that is set in correspondence with the single fifth color data sets that is determined in the determining instructions; and performing, using the personal computer, an updating process for each of the single first reference points repeatedly, wherein the updating process is performed (1) to further set a plurality of second reference points that are uniformly distributed in a subspace in the second color space, the subspace encompassing only a single one among the plurality of second reference points already set in response to the instructions for setting the plurality of second reference points, the fourth color data set of the single second reference point being registered at the single first reference point, each of the plurality of second reference points in the subspace being defined by a set of fourth color data that is defined in the second color space; (2) to set a plurality of sets of fifth color data that are defined in the first color space in one to one correspondence with the plurality of fourth color data sets of the second reference points in the subspace; (3) to calculate, for each of all the second reference points in the subspace, color differences between the fifth color data set for each second reference point in the subspace and the single first reference point, at which the fourth color data set of the single second reference point is registered; (4) to judge whether or not the smallest color difference among all the color differences that are calculated with respect to each of the second reference points in the subspace is smaller than the color difference between the fifth color data set in correspondence with the fourth color data set of the single second reference point and the single first reference point, at which the fourth color data set of the single second reference point is registered; and (5) to update, if the smallest color difference among all the color differences is smaller than the color difference between the fifth color data set in correspondence with the fourth color data set of the single second reference point and the single first reference point, at which the fourth color data set of the single second reference point is registered, the fourth color data set, that is already registered at the single first reference point, to the fourth color data set that is set in correspondence with the fifth color data set having the smallest color difference among all the color differences that are calculated with respect to the each second reference point in the subspace.

* * * * *

UNITED STATES PATENT AND TRADEMARK OFFICE
CERTIFICATE OF CORRECTION

| | | |
|---|---|---|
| PATENT NO. | : 8,018,633 B2 | Page 1 of 1 |
| APPLICATION NO. | : 12/358577 | |
| DATED | : September 13, 2011 | |
| INVENTOR(S) | : Masashi Kuno | |

It is certified that error appears in the above-identified patent and that said Letters Patent is hereby corrected as shown below:

On the title page item [54] and column 1, line 1 should read

-- CONVERSION TABLE CREATING DEVICE, STORAGE MEDIUM STORING CONVERSION TABLE CREATING PROGRAM, AND CONVERSION TABLE CREATING METHOD --

Signed and Sealed this
Fourteenth Day of February, 2012

David J. Kappos
*Director of the United States Patent and Trademark Office*